June 7, 1966 E. L. HELTON ETAL 3,254,727
EARTH RIPPING APPARATUS
Filed Nov. 17, 1964
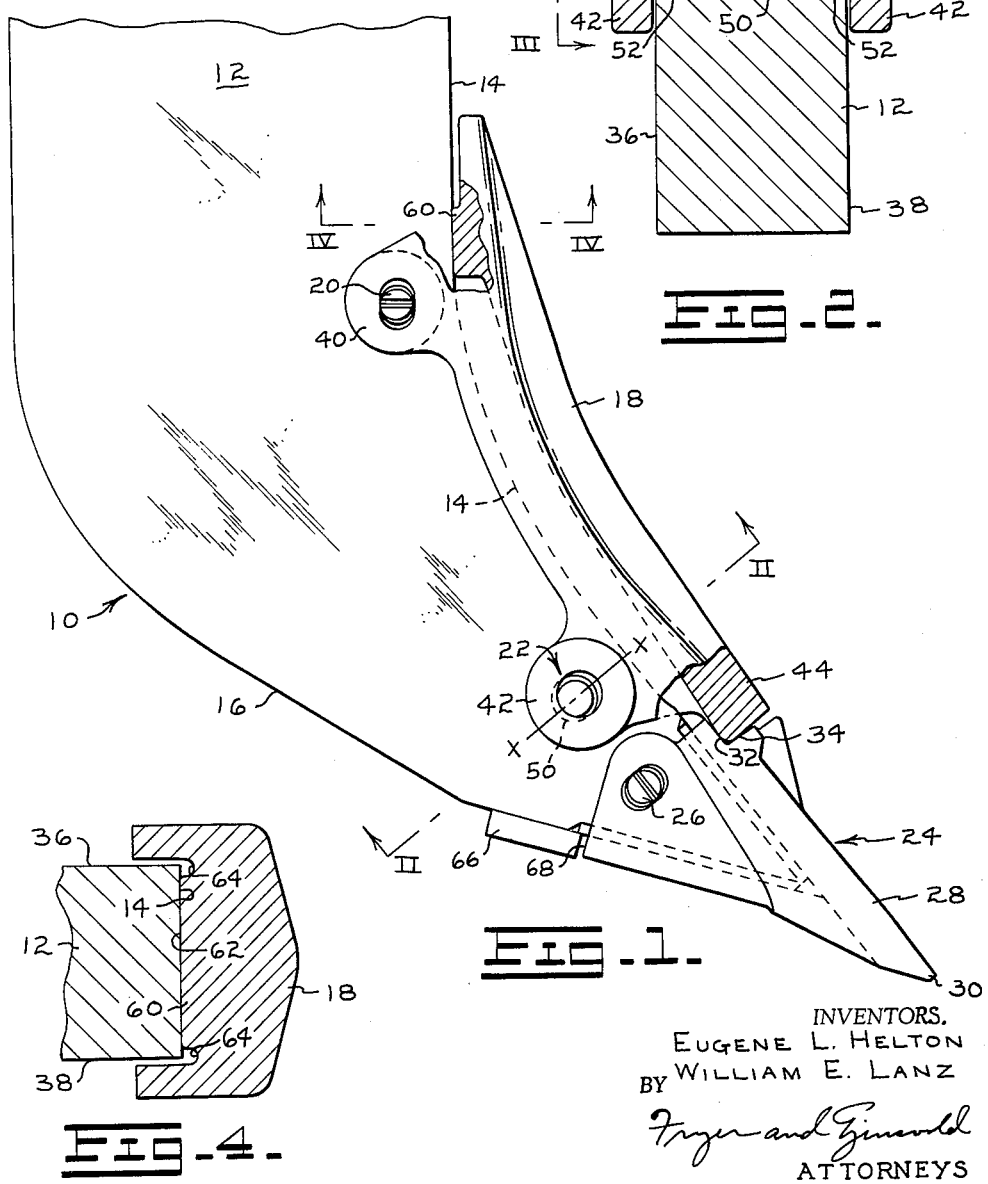
INVENTORS.
EUGENE L. HELTON
BY WILLIAM E. LANZ
ATTORNEYS

United States Patent Office 3,254,727
Patented June 7, 1966

3,254,727
EARTH RIPPING APPARATUS
Eugene L. Helton, Peoria, and William E. Lanz, Joliet, Ill., assignors to Caterpillar Tractor Co., Peoria, Ill., a corporation of California
Filed Nov. 17, 1964, Ser. No. 411,843
5 Claims. (Cl. 172—719)

This invention relates to earth ripping apparatus and more particularly to ripping apparatus which includes a replaceable tip and shank guard which are supported on the ripper shank in a new and improved manner.

Earth ripping apparatus of the type herein disclosed is provided with replaceable ripper tips or teeth which are releaseably attached to the lower end of a ripping shank. In certain prior art constructions the ripping loads encountered by the tooth are transferred to the shank by providing a notched portion in the shank. It has been found that these notches or under-cut portions are areas of great stress concentration which is of sufficient value to cause relatively rapid failure of the shank consequently requiring reworking or replacement of the shank. An example of ripper shanks provided with notches is shown in Patent No. 3,063,176. Accordingly, it is an object of this invention to transfer the ripping loads of the ripper tooth to the shank and yet greatly reduce the areas of stress concentration.

During the digging operation the forward edge of the ripper tooth supporting shank is subject to constant and vigorous abrasion consequently rather rapid wear occurs on such edge. In extending the life of the ripper shank, it is known to provide a protective guard over the leading edge which is pinned to the shank. The guard is usually located adjacent the rearward surface of the tooth and extending upwardly along the leading edge. The guard may be secured to the shank in any suitable manner and preferably it is usually attached to the shank by a pair of laterally spaced pins extending through traversely aligned holes provided in the guard and in the shank. It is a feature of this invention to provide a guard which overlaps an undercut step portion of the tooth thereby defining abutment surfaces between the tooth and the guard. In addition, one of the pins attaching the guard to the shank is formed with eccentrically related surfaces which are effective to retain the guard on the shank and is of sufficient cross-section to resist the shear encountered during the ripping operation. By such an arrangement, the thrust loads of the ripper tooth are transferred to the guard which in turn transfers these loads to the shank through the eccentric pin associated therewith. It is, therefore, another object of this invention to relate the ripper shank guard with the ripping tooth in such a manner that the thrust loads of the ripping tooth are transferred to the shank by the guard.

These and other objects and advantages of this invention will be readily apparent from consideration of the following description and drawings, in which:

FIG. 1 shows the lower end of a ripper shank incorporating the ripper tooth and shank guard constructed according to this invention;

FIG. 2 is an enlarged cross-section taken substantially along the line II—II of FIG. 1 showing the shape of the eccentric pin;

FIG. 3 is an end view taken substantially along the line III—III of FIG. 2 showing the relationship of the centers defining the eccentric surfaces of the pin;

FIG. 4 is a section taken substantially along the line IV—IV of FIG. 1 showing the formation of the upper portion of the guard.

Referring to FIG. 1 the ripper shank incorporating the principles of this invention is generally indicated by the numeral 10 and it includes an elongated ripper shank 12 having a leading edge 14 and a trailing edge 16. Overlying the leading edge is an elongated guard 18 being secured to the shank by a pair of laterally spaced pins 20 and 22. The leading and trailing edges 14 and 16, respectively, converge and intersect to define a wedge shaped terminal end upon which is freely fitted a ripping tooth 24 being releasably secured to the shank by a retaining pin 26 extending through transversely aligned holes formed in the shank and the tip.

The pin 26 is of the type which is longitudinally resilient and is formed with shoulders which prevent axial displacement thereof when it is seated in the bore.

The ripper tooth 24 comprises a relatively thick portion 28 having a relatively sharp leading edge 30 and has the rearward or trailing edge formed to provide generally normally related surfaces 32 and 34 which define a step.

As shown in FIG. 2 the guard 18 is generally U-shaped in cross-section in order to overlie the leading edge 14 and extend partially along the side walls 36 and 38 of the shank 12. The guard 18 is provided with integral laterally spaced lug portions 40 and 42 which will hereinafter be referred to as the upper and lower lugs, respectively. The end of the guard 18 adjacent the rearward end of the ripping tooth 30, indicated by numeral 44, is shaped so that it is adapted to contact the surfaces 32 and 34 of the ripper tooth.

In accordance with the basic feature of this invention the overlapping abutting relationship of the portion 44 with the surfaces 32 and 34 is effective to transfer the ripping forces of the tooth 30 to the guard 18 which in turn transfers such forces to the shank 12 without a necessity of providing an undercut or slot in the shank and consequently avoiding unwarranted stress concentration and ultimate failure of the shank. Referring to FIG. 2, which shows the pin 22 in side elevation, it will be seen that the lugs 42 are provided with holes 46 whose centers are located on a common transverse axis and the portion of the shank 12, located between the lugs, is drilled as indicated at 48 to provide a bore of the same diameter as the holes 46. The pin 22 extends through the holes 46 and 48 attaching the lower portion of the guard 18 to the shank 12.

The pin 22 includes a central portion 50 having a peripheral surface 51 and shoulders 52 which are defined by undercut end portions 54 being formed by removing generally crescent-shaped portions from the opposite ends of the pin. The particular geometry of the portions 50 and 54 is shown in FIG. 3 wherein the intersection of the axes X—X and Y—Y is indicated by the letter O defines the center of the surface 51. In forming the shoulders 52, the origin indicated by O' and defined by the intersection of the axes X—X and Y'—Y' describes the surface 56 whose radial distance from the center O' is substantially the same as the radial distance of the surface 51 of the portion 50 from the center O. Thus, it is seen that the generally crescent-shaped portions removed from the ends of the pin 22 result in eccentrically related surfaces 51 and 56.

When the guard 18 is positioned adjacent the leading edge 14 of the shank 12, the holes 46 and 48 are held in alignment so that the pin 22 can be inserted in these holes attaching the lower end of the guard 18 to the shank. The pin is then turned so that the axis X—X is substantially perpendicular to the leading edge 14. With the pin so positioned, the axes of the holes 46 and 48 are laterally displaced and the shoulders 52 are effective to lock the pin in place.

In assembling the guard 18 and the ripper tooth 24 on the shank 12, the guard 18 is located so that the pin 20 can be first inserted and then the holes 46 in the lugs 42 are aligned with the hole 48 in the shank so that the solid pin 22 can be inserted. After the pin 22 is inserted, it is oriented in the manner described. Then the ripper tooth 28 is fitted on the end of the shank 12 and the pin 26 is inserted. It is to be noted that when the pin 22 is rotated aligning the axis X—X perpendicular to the leading edge 14, the guard 18 can be rotated in a counter-clockwise direction about pad or boss 60 thus permitting the surface 34 to contact the lower edge of the guard 18. Such an overlapping relationship achieves the result of maintaining the orientation of the pin 22 and provides reaction surfaces which are effective to withstand ripping forces tending to cause clockwise rotation of the tip 24 about the axis of pin 26.

The ripping forces imparted to the portion 44 of the guard 18 are transferred to the shank 12 mainly by the solid pin 22. Provision of the solid pin 22 incorporating relatively large cross-sectional areas to resist the shearing forces and the absence of sharp transitional surfaces on the shank 12 results in a very rugged and reliable structure.

Further contributing to the transfer of ripping forces to the shank in a manner which precludes concentration of stress this invention provides a pad or boss on the guard 18 which is held in contact with the leading edge 14. Referring to FIGS. 1 and 4, it will be seen that the upper, generally vertical, portion of the guard 18 is formed with a pad 60 having a planar surface 62 resting against the leading edge 14. The guard 18 is preferably formed by casting and the mold incorporates male fillets which define casting reliefs 64 on the opposite sides of the pad 60 in order to eliminate contact of the guard with the corners defined by the forward edge 14 and the side walls 36 and 38 and thus insure intimate contact of the surface 62 with the leading edge 14. Accordingly, a portion of the load encountered by the guard 18 is transferred to the shank 12 by the pad 60.

In the event forces of a magnitude sufficient to rotate the tooth 24 about the axis of the pin 26 in a clockwise direction are great enough to displace the tooth a predetermined amount, a block 66 is welded to the trailing edge 16 so that a stop surface is encountered by the rearward lower transverse edge 68 of the tooth. This forceably resists further clockwise rotation of the tooth.

Thus according to this invention ripping forces encountered by the tooth are transferred to the shank by a solid pin which has a novel shape operating to retain the pin against axial displacement while at the same time the shank is absent of any rapid changes in cross-section thereby substantially eliminating destructive values of stress. The unique relationship of the tooth and the guard allows the ripping forces to be transferred to the thick portions of the shank further contributing to ruggedness of the apparatus.

We claim:

1. A ripping apparatus comprising a supporting shank adapted to be positioned below the surface of the earth for ripping; said shank being formed to define a wedge-shaped tip; a ripper tooth loosely fitted on said tip by a retaining pin and adapted to be positively locked thereto; said tooth comprising a wear plate extending along the leading edge of said shank and terminating in a stepped surface; an elongated guard also extending along the leading edge and having the lower end thereof formed to be received by the stepped surface of said tooth to assist in positively locking the tooth and guard to the shank and to each other; a retaining pin extending through aligned holes formed in the lower portion of said guard and said shank, said holes having substantially the same diameter, and camming surfaces on said pin being engageable with the holes in said guard whereby said lower end of said guard may be rotated into seating engagement with said stepped surface of said tooth thereby positively locking said tooth and said guard to the shank and to each other.

2. A ripping apparatus of the type including a ripper tooth and a guard mounted on a shank, in combination therewith of transversely spaced pins releasably securing said guard to the leading edge of said shank, another pin securing said tooth to the lower terminal portion of said shank and having a heavy plate overlying the leading edge of said shank thereby defining a continuation of said guard, the portion of said tooth adjacent said guard being formed to underlie said guard, one of said transversely spaced pins having eccentric surfaces which are effective to both maintain such underlying relationship thereby transferring a portion of the ripping forces of said tooth and guard to said shank and to positively lock the tooth and guard to the shank and to each other.

3. A ripping apparatus comprising an elongated shank, a channel-shaped guard and a tooth mounted on said shank in longitudinal adjacency along the leading edge thereof, a stepped portion on said tooth for receiving the adjacent end of said guard and thereby providing abutment surfaces therebetween, a solid pin attaching said guard to said shank, said pin having a central circular portion terminating at shoulders defined by removing crescent-shaped portions whose surfaces are eccentric to the central portion, said central portion being received in a hole formed in said shank and the end portions being received in axially aligned holes formed in the side walls of said guard, said pin being effective when oriented in a predetermined manner to both maintain said guard in the stepped portion of said tooth which in turn prevents axial and rotational displacement of said pin, and which positively locks said tooth and guard to the shank and to each other.

4. In an apparatus of the character described, a shank, a ripping tooth and a guard releasably mounted on said shank, pin means located in aligned sets of holes for mounting said guard and tooth to said shank, said tooth and guard defining a continuous wall overlying the leading edge of said shank, one set of said holes being of substantially the same diameter and having a solid camming pin inserted therein for holding the guard to said shank, a transverse step formed on the upper rearward edge of said tooth in which is seated the lower end of the said guard, and axially spaced shoulders on said solid pin defined by a transition surface between its cam surfaces for preventing axial displacement of said pin and for positively locking said guard and tooth to said shank and to each other when it is oriented in a predetermined manner thus seating the lower end of said guard in said step.

5. The invention according to claim 4 further comprising a projecting pad on said guard in contact with the leading edge of said shank which is adapted to transfer a portion of the ripping forces to said shank.

References Cited by the Examiner

UNITED STATES PATENTS 3,025,619   3/1962   Towne et al. _____ 37—142
3,085,635   4/1963   Livermore _____ 172—719 X ABRAHAM G. STONE, *Primary Examiner.*

ANTONIO F. GUIDA, *Examiner.*

J. R. OAKS, *Assistant Examiner.*